United States Patent [19]

Pellegrini, Jr. et al.

[11] 4,148,981

[45] Apr. 10, 1979

[54] DITHIOPHOSPHORYLATED COPOLYMERS OF AZIRIDINEETHYL ACRYLATES OR METHACRYLATES AND ALKYL ACRYLATES OR METHACRYLATES

[75] Inventors: John P. Pellegrini, Jr., Pittsburgh; Helen I. Thayer, Oakmont, both of Pa.

[73] Assignee: Gulf Research & Development Company, Pittsburgh, Pa.

[21] Appl. No.: 843,331

[22] Filed: Oct. 18, 1977

[51] Int. Cl.$^2$ .................. C08F 8/40; C08F 222/06
[52] U.S. Cl. .................................. 526/16; 252/49.8; 526/28; 526/263; 526/278
[58] Field of Search .................. 260/79.7; 526/16, 28, 526/278

[56] References Cited

U.S. PATENT DOCUMENTS

| 3,719,646 | 3/1973 | Stecklen | 260/79.7 |
| 3,826,745 | 7/1974 | Ryer | 252/32.7 E |
| 3,864,099 | 2/1975 | Ek | 252/51.5 |
| 3,865,740 | 2/1975 | Goldschmidt | 252/46.7 |

*Primary Examiner*—C. A. Henderson

[57] ABSTRACT

Dialkyl, diaryl, dialkaryl, diarylalkyl or diaryloxyalkyl dithiophosphorylated aziridineethyl acrylate or methacrylate/alkyl acrylate or alkyl methacrylate copolymers are claimed. These can be produced by reacting a dialkyl, diaryl, dialkaryl, diarylalkyl or diaryloxyalkyl dithiophosphate with a copolymer of (A) a monomeric aziridineethyl acrylate or methacrylate and (B) a monomeric alkyl acrylate or alkyl methacrylate.

15 Claims, No Drawings

DITHIOPHOSPHORYLATED COPOLYMERS OF AZIRIDINEETHYL ACRYLATES OR METHACRYLATES AND ALKYL ACRYLATES OR METHACRYLATES

BACKGROUND OF THE INVENTION

1. Field of the Invention

This invention relates to new compounds comprising dithiophosphorylated copolymers of aziridineethyl acrylates or methacrylates/alkyl acrylates or alkyl methacrylates and to the preparation of such compositions. These dithiophosphorylated aziridineethyl acrylate or methacrylate/alkyl acrylate or alkyl methacrylate copolymers are suitable for use as metal-free, anti-wear agents in lubricating oil compositions. The copending application of Pellegrini et al entitled Lubricating Oils Containing Dithiophosphorylated Copolymers of Aziridineethyl Acrylate or Methacrylate and Alkyl Acrylate or Alkyl Methacrylate, Ser. No. 843,315, filed Oct. 18, 1977, describes lubricating oil compositions suitable for use in combination with the dithiophosphorylated copolymers disclosed herein the disclosure of which is incorporated herein by reference.

2. Description of The Prior Art

The monomeric aziridinylethyl carboxylic acid esters from which the copolymers in the present invention are prepared are known. For example, the preparation of aziridineethyl methacrylate and aziridineethyl acrylate is described in U.S. Pat. No. 3,338,885 issued to Coker et al. on Aug. 29, 1967, which discloses the preparation of 2-(1-aziridinyl) ethyl methacrylate by heating dried methyl methacrylate with N-(2-hydroxyethyl) aziridine in the presence of N,N'-diphenyl-p-phenylenediamine as a polymerization inhibitor. The mixture is heated and small pieces of sodium are added. The product is next cooled, filtered and distilled. A distillation cut obtained at 111.2° F. (44° C.) at 0.1 mm of Hg comprises 2-(1-aziridinyl)ethyl methacrylate.

The monomeric $C_8$–$C_{18}$ alkyl esters of acrylic and methacrylic acid are also known and disclosed, for example, in U.S. Pat. No. 3,864,099, issued to Ek on Feb. 4, 1975. Monomeric $C_8$–$C_{18}$ alkyl esters of acrylic or methacrylic acid are described as particularly suitable for copolymerizing with aziridineethyl acrylate or methacrylate using conventional techniques in the art.

Similarly, dithiophosphoric acid esters and their derivatives are known and described, for example, in U.S. Pat. No. 3,826,745 issued to Ryer et al. on July 30, 1974, which teaches dithiophosphoric acid ester derivatives in combination with amine salts of mixed acid phosphates as antiwear, corrosion inhibitors and anti-oxidant additives for lubricating oils. These dithiophosphates are additionally described as suitable for use in any type lubricating oil compositions, including animal and vegetable oils as well as mineral lubricating oils and synthetic oils.

U.S. Pat. No. 3,865,740 issued to Goldschmidt on Feb. 11, 1975, describes certain alkyl, aryl, alkaryl or arylalkyl 0,0'-diesters of dithiophosphoric acid which may serve as extreme pressure agents, antioxidants and ashless dispersants for lubrication oil compositions.

It must be noted, however, that the specific dialkyl, diaryl, dialkaryl, diarylalkyl, or diaryloxyalkyl dithiophosphorylated copolymers claimed herein are new.

SUMMARY OF THE INVENTION

This invention encompasses new compositions particularly suitable for use as metal-free, anti-wear additives in lubricating oils. In particular, the compositions comprise dialkyl, diaryl, dialkaryl, diarylalkyl or diaryloxyalkyl dithiophosphorylated copolymers of (A) a monomeric aziridineethyl α-substituted acrylate or methacrylate having the formula:

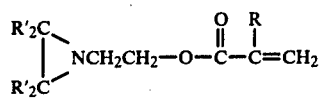

wherein R is selected from the group consisting of hydrogen and alkyl having from about 1 to about 6 carbon atoms, preferably from about 1 to about 3 carbon atoms; and each R' is either alike or different, selected from hydrogen and lower alkyl groups of from about 1 to about 8 carbon atoms, preferably from about 1 to about 4 carbon atoms; and (B) a monomeric alkyl acrylate or methacrylate of the formula:

$$CH_2=CR''COOR'''$$

wherein R" is selected from the group of hydrogen and methyl, and R''' is selected from straight and branched chain alkyl groups containing from about 1 to about 30 carbon atoms; preferably from about 1 to about 20 carbon atoms; with the mole ratio of A to B being in the range of about 1:99 to about 30:60; preferably from about 1:99 to about 10:90, said copolymer comprising the formula:

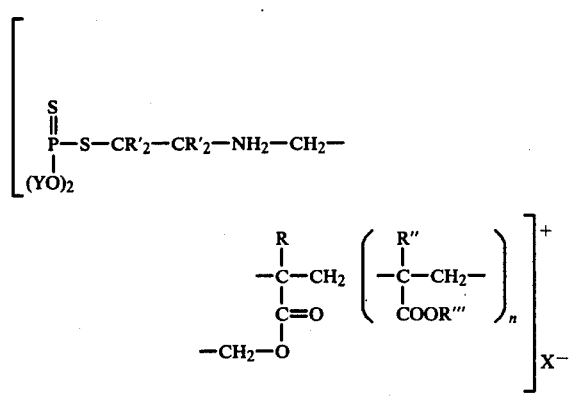

wherein R, R', R" and R''' are described above; Y is alkyl, aryl, alkaryl, arylalkyl or aryloxyalkyl having from about 1 to about 30 carbon atoms; preferably from about 1 to about 20 carbon atoms; $X^-$ is

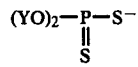

wherein Y is defined above; and wherein n is an integer of from about 1 to about 300, preferably from about 2 to about 99; said copolymer having a molecular weight of at least about 20,000, especially from about 20,000 to about 300,000, preferably from about 100,000 to about 300,000, most preferably from about 100,000 to about 200,000; with at least about 0.1 weight percent to about 60 weight percent, preferably from about 1.0 to about 30 weight percent comprising the dialkyl, diaryl, dialkaryl, diarylalkyl; or diaryloxyalkyl dithiophosphate moiety.

DETAILED DESCRIPTION OF THE INVENTION

The present invention relates to dialkyl, diaryl, dialkaryl, diarylalkyl or diaryloxyalkyl dithiophosphorylated copolymers of aziridineethyl acrylates or methacrylates and alkyl acrylates or methacrylates which are particularly suitable for use in lubricating oil compositions as metal-free, anti-wear additives.

The aziridineethyl acrylate or methacrylate monomers and alkyl acrylate or methacrylate monomers of the present invention are conveniently prepared from the corresponding acrylic or methacrylic acids. These acids can be synthesized using conventional methods and techniques. For example, acrylic acid is prepared by the acidic hydrolysis and dehydration of ethylene cyanohydrin or by the polymerization of $\beta$-propiolactone and the destructive distillation of the polymer to form acrylic acid.

Methacrylic acid is readily prepared by the oxidation of methyl $\alpha$-alkyl vinyl ketone with metal hypochlorites; the dehydration of $\alpha$-hydroxyisobutyric acid with phosphorus pentoxide; or by the hydrolysis of acetone cyanohydrin.

Suitable aziridineethyl acrylate or methacrylate monomers are prepared by an ester interchange reaction between an ester of an ethylenically unsaturated monocarboxylic acid such as acrylic or methacrylic acid and a (1-aziridinyl)alkanol compound, or a (1-aziridinyl)alkanol compound in which at least one carbon atom of the aziridinyl group is substituted. Illustrative examples of suitable aziridinyl alcohols used to prepare the esters utilized in the present invention include 2-(1-aziridinyl)ethanol, 2-(2-methyl-1-aziridinyl)ethanol, 2-(2-dimethyl-1-aziridinyl)ethanol, 2-(2-ethyl-1-aziridinyl)ethanol, 2-(1-aziridinyl)-1-propanol, 2-(2,3-dimethyl-1-aziridinyl)-1-butanol, 2(2,2-dimethyl-1-aziridinyl)-1-butanol, 2(2,2-diethyl-1-aziridinyl)-1-ethanol, 2-(2-n-butyl-1-aziridinyl)-1-ethanol, 1-(2-methyl-3-ethyl-1-aziridinyl)-2-butanol or 1-(1-aziridinyl)-2-hexanol.

The alkyl acrylate or methacrylate monomers of the present invention are conveniently prepared by reacting the desired primary alcohol with the acrylic acid or methacrylic acid in a conventional esterification. Suitable alkyl acrylates or alkyl methacrylates contain from about 1 to about 30 carbon atoms in the alkyl carbon chain. Typical examples of starting alcohols include methyl alcohol, ethyl alcohol, propyl alcohol, isopropyl alcohol, butyl alcohol, isobutyl alcohol, sec-butyl alcohol, t-butyl alcohol, 2-ethylhexyl alcohol, octyl alcohol, Oxo-octyl alcohol, isodecyl alcohol, undecyl alcohol, dodecyl alcohol, tridecyl alcohol, capryl alcohol, lauryl alcohol, myristyl alcohol, pentadecyl alcohol, palmityl alcohol and stearyl alcohol. It is to be noted that all of the starting alcohols described above can be reacted with acrylic acid or methacrylic acid to form desirable acrylates or methacrylates.

The copolymers useful in the practice of this invention can be prepared in a conventional manner by bulk, solution or dispersant polymerization methods using known catalysts. Thus, the copolymers utilized by this invention can be prepared from the corresponding monomers with a diluent such as water in a heterogeneous system, usually referred to as emulsion or suspension polymerization, or with a solvent such as toluene, benzene, ethylene dichloride, or in a homogeneous system, normally referred to as solution polymerization. Solution polymerization in benzene, toluene or a solvent having similar chain transfer activity is the preferred method used in forming the copolymers disclosed herein, because this method and solvent produce preferred copolymers characterized by a relatively high molecular weight. Solvents normally comprise from about 50 to about 90 weight percent based on the weight of the copolymer.

Copolymerization of the monomers used herein readily takes place under the influence of heat, light and/or catalysts. Suitable catalysts include peroxide-type free radical catalysts such as benzoyl peroxide, lauroyl peroxide, or t-butylhydroperoxide and free radical catalysts such as $\alpha$, $\alpha'$-azodiisobutyronitrile. The catalysts, when used, are employed in concentrations ranging from a few hundreds percent to two percent by weight of the monomers. The preferred concentration is from about 0.2 to about 1.0 percent by weight of the monomers.

Copolymerization of the monomers used herein takes place over a wide temperature range depending upon the particular monomers and catalyst utilized in the reaction. For example, copolymerization can take place at temperatures as low as $-103°$ F. ($-75°$ C.) or lower when metallic sodium in liquid ammonia is used as the catalyst. However, the copolymerization reaction is generally carried out at temperatures ranging from about 77° F. (25° C.) to about 302° F. (150° C.) when a catalyst such as $\alpha,\alpha'$azodiisobutyronitrile is used. The copolymerization reaction is preferably carried out in an inert atmosphere, for example, argon or nitrogen to favor the formation of copolymers having relatively high viscosities and molecular weights.

Preferably, the copolymerization reaction is carried out to substantial completion so that the finished product is essentially comprised of the ratio of monomers introduced into the reaction vessel. Normally, a reaction time of from about 1 to about 72 hours, preferably from about 1 to about 50 hours, is sufficient to complete the copolymerization process.

The copolymers disclosed herein have an average molecular weight of greater than about 20,000, especially a molecular weight range of from about 20,000 to about 300,000, preferably from about 100,000 to about 300,000, most preferably from about 100,000 to about 200,000. The molecular weight of the copolymer can conveniently be determined using conventional techniques.

Specific examples of copolymers which can be used according to the invention are the 1:2, 1:4, 1:9, and 1:18 to 1:99 mole ratio copolymers of (A) monomeric aziridineethyl acrylate or methacrylate and (B) monomeric lauryl acrylate or methacrylate. Examples of other copolymers which can be used in compositions of the invention are the 1:4, 1:9, and 1:19 to 1:99 mole ratio copolymer of (A) monomeric aziridineethyl acrylate or methacrylate and (B) monomeric n-octyl, Oxo-octyl, 2-ethylhexyl, isodecyl, undecyl, tridecyl, capryl, lauryl, myristyl, palmityl and stearyl acrylates and methacrylates.

The third component of the copolymers suitable for use herein comprises the dialkyl, diaryl, dialkaryl, diarylalkyl, or diaryloxyalkyl dithiophosphates which have the general formula:

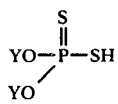

wherein Y is selected from alkyl, aryl, alkaryl, arylalkyl and aryloxyalkyl groups having from about 1 to about 30 carbon atoms, preferably from about 1 to about 20 carbon atoms. The dialkyl, diaryl, dialkaryl, diarylalkyl, or diaryloxyalkyl dithiophosphates can be obtained from commercial sources or can be prepared by known conventional methods. For example dialkyl, diaryl, dialkaryl, diarylalkyl or diaryloxyalkyl dithiophosphates can be prepared by reacting phosphorus pentasulfide with an aliphatic alcohol, phenol, alkyl substituted phenol, arylalkanol or aryloxyalkanol containing the desired range of hydrocarbyl groups.

The aliphatic alcohol, phenol, alkyl substituted phenol, arylalkanol or aryloxyalkanol is normally reacted in a molar ratio of approximately 4 moles of alcohol for each mole of phosphorus pentasulfide to form the corresponding dialkyl, diaryl, dialkaryl, diarylalkyl, or diaryloxyalkyl dithiophosphate.

The dithiophosphates of the present invention are conveniently prepared by mixing the desired alcohol with phosphorous pentasulfide and a solvent such as benzene or toluene in a container such as a glass flask equipped with stirrer, thermometer and reflux condenser and raising the temperature from about 122° F. (50° C.) to about 302° F. (150° C.) under reflux and with stirring for 2 to about 24 hours. The dithiophosphate is next cooled and filtered using conventional methods. Suitable dialkyl, diaryl, dialkaryl, diarylalkanol or diaryloxyethanol, starting alcohols include isopropanol, butanol, 2-ethylhexanol, Oxo-octanol, tridecanol, tetradecanol, hexadecanol, cyclohexanol, methylcyclohexanol, phenol, cresol, butylphenol, dioctylphenol, dinonylphenol, didecylphenol, phenylethanol, phenylcarbinol, cresoxyethanol and cresoxypropanol.

The dialkyl, diaryl, dialkaryl, diarylalkyl or diaryloxyalkyl dithiophosphates used herein are sufficiently strong acidic materials to be corrosive to metals and may cause minor irritation if allowed to come into contact with the human skin. Therefore, special care should be exercised in the handling and storage of these compounds. The dithiophosphoric acid diesters herein are usually manufactured in stainless steel, glass lined steel, or Pyrex shatterproof glass containers and it is standard practice to store them in stainless steel storage bins.

In preparing the novel compounds of the present invention a dialkyl, diaryl, dialkaryl, diarylalkyl or diaryloxyalkyl dithiophosphate substantially as herein described, is reacted with an aziridineethyl acrylate or methacrylate/alkyl acrylate or alkyl methacrylate copolymer to form the dithiophosphate derivative thereof. In particular, sufficient dialkyl, diaryl, dialkaryl, diarylalkyl or diaryloxyalkyl dithiophosphate is added to a copolymer of aziridineethyl acrylate or methacrylate and alkyl acrylate or methacrylate to comprise from about 0.1 weight percent to about 60 weight percent of the resulting product, especially about 1.0 weight percent to about 30 weight percent.

The reaction is preferably conducted in an inert atmosphere such as nitrogen or argon and at a temperature of from about 20° C. to about 100° C. for a period sufficient to react all of the acid with the copolymer. In particular, the acid and copolymer are introduced into a container having an inert atmosphere and reflux condenser and is heated for about 1 to about 48 hours. Although it is not desired to be bound by any theory it is believed that the dithiophosphate moiety attacks the aziridineethyl ring structure and forms a dithiophosphate salt of the copolymer.

METHOD OF PREPARATION

In a preferred method of preparation, dialkyl, diaryl, dialkaryl, diarylalkyl or diaryloxyalkyl dithiophosphate aziridineethyl acrylate or methacrylate and alkyl acrylate or alkyl methacrylate copolymers are prepared in the following manner.

A 5-liter, 3-neck Pyrex glass flask equipped with a mechanical stirrer, a reflux condenser, heating mantle and thermometer is charged with from 1.25 moles to 25 moles of a solvent selected from the group of hexane, heptane, benzene, toluene, xylene, cyclohexane or mineral oil.

The flask is charged with from about 0.15 mole to about 1.0 mole of the desired aziridineethyl acrylate or methacrylate monomer. Examples of suitable aziridineethyl acrylate or methacrylate monomers include 2-(1-aziridinyl)ethyl, 2-(2-methyl-1-aziridinyl)ethyl, 2-(2-dimethyl-1-aziridinyl)ethyl, 2-(2-ethyl-1-aziridinyl)ethyl, 2-(1-aziridinyl)-1-propyl, 2-(2,3-dimethyl-1-aziridinyl)-1-butyl, 2(2,2-dimethyl-1-aziridinyl)-1-butyl, 2(2,2,-diethyl-1-aziridinyl)-1-ethyl, 2-(2-n-butyl-1-aziridinyl)-1-ethyl, 1-(2-methyl-3-ethyl-1-aziridinyl)-2-butyl and 1-(1-aziridinyl)-2-hexyl acrylates or methacrylates.

Next, from about 0.75 moles to about 3.5 mole of the desirable alkyl acrylate or methacrylate monomer containing from about 1 to about 30 carbon atoms in the alkyl carbon chain is added to the flask. Representative alkyl acrylates or methacrylates include methyl, ethyl, propyl, isopropyl, butyl, isobutyl, sec-butyl, t-butyl, 2-ethylhexyl, octyl, Oxo-octyl, isodecyl, undecyl, dodecyl, tridecyl, capryl, lauryl, myristyl, pentadecyl, palmityl or stearyl acrylates or methacrylates.

From about 0.005 mole to about 0.200 mole of a catalyst selected from the group of benzoyl peroxide, lauroyl peroxide, α,α'-azodiisobutyronitrile or t-butyl hydroperoxide is added to the mixture and the system is flushed with nitrogen for about 1 hour. The mixture is heated from about 4 hours to about 25 hours at a temperature of about 104° F. (40° C.) to about 212° F. (100° C.). The mixture is allowed to cool and from about 0.3 mole to about 2.0 moles of a dialkyl, diaryl, dialkaryl, diarylalkyl, or diaryloxyalkyl dithiophosphate is added to the flask. Representative examples of suitable dithiophosphates include diisopropyl dithiophosphate, dibutyl dithiophosphate, di(2-ethylhexyl)dithiophosphate, di(Oxo-octyl)dithiophosphate, di(tridecyl)dithiophosphate, di(tetradecyl)dithiophosphate, di(hexadecyl)dithiophosphate, di(cyclohexyl)dithiophosphate, di(methyl-cyclohexyl)dithiophosphate, di(phenyl)dithiophosphate, di(cresyl)dithiophosphate, di(butylphenyl)dithiophosphate, bis(di-octyl-phenyl)dithiophosphate, bis(dinonylphenyl)dithiophosphate, bis(didecylphenyl)dithiophosphate, di(phenylethyl)dithiophosphate, di(phenylcarbinyl)dithiophosphate, di(cresoxyethyl)dithiophosphate, or di(cresoxypropyl)dithiophosphate. The system is again flushed with nitrogen for 1 hour and heated at a temperature of from about 104° F. (40° C.) to about 212° F. (100° C.) from about 4 hours to about 24 hours. The finished product is allowed to cool, and the solvent removed at reduced pressure. Alternatively, the product prepared in all these solutions may be directly blended into base mineral oil or lubricating oil stocks.

The foregoing method of preparation is illustrative of a preferred mode for preparing dithiophosphorylated aziridineethyl acrylate or methacrylate and alkyl acrylate or methacrylate copolymers. Also, in accordance with the method described above, the 1:2, 1:4, 1:6, 1:8, 1:10, 1:12, 1:14, 1:16 and 1:18 to 1:99 mole ratio copolymers substantially as disclosed herein can be prepared by reacting the proper monomer weight ratios to produce the desired copolymer. The copolymers have a molecular weight of greater than about 20,000, especially a molecular weight range of from about 20,000 to about 300,000, preferably from about 100,000 to about 300,000, most preferably from about 100,000 to about 200,000. Conventional techniques can be used to determine the copolymer molecular weight.

Normally, the dialkyl, diaryl, dialkaryl, diarylalkyl or diaryloxyalkyl dithiophosphate constituent of the copolymer comprises from about 0.1 weight percent to about 60 weight percent of the copolymer, preferably from about 1.0 weight percent to about 30 weight percent of the copolymer, depending upon the mole ratio of the various monomers in the copolymer.

As pointed out hereinabove, the dithiophosphorylated copolymers of the present invention are substantially oil soluble and have superior viscosity index improving properties as well as metal-free, anti-wear properties when incorporated in mineral and synthetic oils.

The order of addition in forming the copolymers herein is not important. For example, the aziridineethyl acrylate or methacrylate and alkyl acrylate or methacrylate copolymer may be formulated and the dithiophosphate moiety reacted therewith. Alternatively, the dithiophosphate moiety may be reacted with the aziridineethyl acrylate or methacrylate and the resulting compound can be reacted with the alkyl acrylate or methacrylate. It is to be noted, however, that in the alternative reaction, the catalyst is not added to the reaction until the last step wherein the copolymer is formed. The resulting compounds have similar properties.

The following examples are illustrative of the invention herein described and are not intended to limit the scope thereof.

EXAMPLE I

Preparation of Dibutyl Dithiophosphate, Aziridineethyl Methacrylate/Isodecyl Methacrylate Copolymer (2.5:97.5 mole ratio)

An aziridineethyl methacrylate/isodecyl methacrylate copolymer having a mole ratio of 2.5:97.5 was prepared by charging a 3-liter flask, equipped with a reflux condenser thermometer and mechanical stirrer, with 450.0 grams of light neutral oil, 220.7 grams (0.975 mole) of isodecyl methacrylate and 4.22 grams (0.025 mole) of aziridineethyl methacrylate and 1.6 grams of $\alpha,\alpha'$-azodiisobutyronitrile. The system was flushed with nitrogen for ½ hour and the mixture was heated at 149° F. (65° C.) for 10 hours.

A 500 milliliter flask equipped with a mechanical-stirrer, thermometer and a standard reflux condenser was charged with 45.0 grams aziridineethyl methacrylate/isodecyl methacrylate copolymer having a mole ratio of 2.5:97.5 respectively, 90 grams light neutral oil and 2.610 grams of dibutyl dithiophosphoric acid. The system was next flushed with nitrogen and the mixture heated with stirring for 5 hours at 176° F. (80° C.). The dithiophosphorylated copolymer which resulted from the above reaction is especially suited for use as metal-free, anti-wear agents when formulated with engine lubricating compositions.

EXAMPLE II

Preparation of Dibutyl Dithiophosphate Aziridineethyl Methacrylate/Lauryl Methacrylate Copolymer (5:95 mole ratio)

A 2-liter Pyrex glass flask equipped with a mechanical stirrer, thermometer, and water cooled condenser was charged with 894.0 grams of aziridineethyl methacrylate/lauryl methacrylate copolymer having a mole ratio of 5:95, 1000 grams of benzene and 30.0 grams of dibutyl dithiophosphoric acid. The system was flushed with nitrogen for ½ hour and the mixture was heated at 176° F. (80° C.) for 4 hours. The product recovered had a yellowish color. Analysis indicated that 920.5 grams of dibutyl dithiophosphate aziridineethyl methacrylate/lauryl methacrylate copolymer was recovered.

EXAMPLE III

Preparation of Dibutyl Dithiophosphate, Aziridineethyl Methacrylate/Lauryl Methacrylate Copolymer (1:9 mole ratio)

A 1:9 mole ratio of dibutyl dithiophosphate copolymer of aziridineethyl methacrylate and lauryl methacrylate is prepared by refluxing 6.8 grams (0.04 mole) of aziridineethyl methacrylate, 91.4 grams (0.36 mole) of lauryl methacrylate, 0.66 gram of $\alpha,\alpha'$-azodiisobutyronitrile in 300 grams of toluene at a temperature of 176° F. (80° C.) for 8 hours under a nitrogen atmosphere. To this solution is added 19.4 grams (0.08 mole) of dibutyl dithiophosphate and the solution is heated at 140° F. (60° C.) for an additional 4 hours. The toluene is removed by vacuum distillation. The finished product is quite viscous and has an average molecular weight in excess of 100,000.

EXAMPLE IV

Preparation of Dibutyl Dithiophosphate, Aziridineethyl Methacrylate/Lauryl Methacrylate Copolymer (1:12 mole ratio)

A 1:12 mole ratio of dibutyl dithiophosphate copolymer of aziridineethyl methacrylate and lauryl methacrylate is prepared by heating 26.2 grams (0.154 mole) of aziridineethyl methacrylate, 469.7 grams (1.85 moles) of lauryl methacrylate, 3.0 grams of $\alpha,\alpha'$-azodiisobutyronitrile in 1200 grams of toluene at a temperature of 176° F. (80° C.) for 8 hours under a nitrogen atmosphere. Next, 74.6 grams of dibutyl dithiophosphate is added to the solution and heating is continued for 4 hours. The toluene is removed by vacuum distillation and the finished product is cooled and filtered. The copolymer is very viscous, has a pale yellow color and an average molecular weight in excess of 100,000.

EXAMPLE V

Preparation of Dibutyl Dithiophosphate, Aziridineethyl Methacrylate/Lauryl Methacrylate Copolymer (1:19 mole ratio)

A 1:19 mole ratio of dibutyl dithiophosphate copolymer of aziridineethyl methacrylate and lauryl methacrylate is prepared by copolymerizing 15.2 grams (0.090 mole) of aziridineethyl methacrylate, 434 grams (1.71 moles) of lauryl methacrylate, and 2.9 grams of α,α'-azodiisobutyronitrile in 1000 grams of toluene at a temperature of 80° C. for 8 hours under a nitrogen atmosphere. To the copolymer solution is added 21.8 grams of dibutyl dithiophosphoric acid and the heating is continued for 4 hours. The toluene is removed by vacuum distillation and the finished product is cooled and filtered. The copolymer is very viscous and has an average molecular weight in excess of 100,000. It is to be noted that the aziridineethyl methacrylate and dibutyl dithiophosphate is in a mole ratio of 1:1 in the above copolymer.

EXAMPLE VI

Preparation of O,O-Di(t-Butylphenyl)Dithiophosphate Aziridineethyl Methacrylate/Lauryl Methacrylate Copolymer (1:19 mole ratio)

A one-liter, three-neck Pyrex glass flask containing a reflux condenser, mechanical stirrer and thermometer was charged with 100 grams of t-butylphenol, and heated to the melting point. The system was flushed with nitrogen gas; one gram of ammonia and 100 grams of phosphorus pentasulfide were introduced into the system. The reaction was conducted at a temperature of 284° F. (140° C.) for 3 hours. The mixture was next cooled, and 250 ml. benzene added; next, the mixture was filtered to remove excess phosphorus pentasulfide; 61.5 grams of phosphorus pentasulfide was recovered. The O,O-di(t-butylphenyl)dithiophosphoric acid recovered was light brown in color, and had a melting point of from 125°–128° C.

A mixture of 1.0 grams (0.006 mole) of aziridineethyl methacrylate, 30.0 grams (0.114 mole) of lauryl methacrylate, 100 grams of benzene and 0.2 gram of α,α'-azodiisobutyronitrile is heated at 60° C. with stirring in a nitrogen atmosphere for 10 hours. To the resulting copolymer is added 4.7 grams (0.012 mole) of O,O-di(t-butylphenyl)dithiophosphoric acid. The system is flushed with nitrogen and the mixture is heated for 4 hours at 158° F. (70° C.). The O,O-di(t-butylphenyl)dithiophosphorylated copolymer of aziridineethyl methacrylate and lauryl methacrylate has a molecular weight in excess of 100,000.

EXAMPLE VII

Preparation of Bis(Dioctylphenyl)Dithiophosphate Aziridineethyl Methacrylate/Lauryl Methacrylate Copolymer (10:90 mole ratio)

A one-liter, three-neck Pyrex glass flask containing a reflux condenser, mechanical stirrer and thermometer was charged with 159.0 grams of dioctylphenol. The system was flushed with nitrogen gas and heated to a temperature of 122° F. (50° C.). One gram of ammonia was added and 44.5 grams of phosphorous pentasulfide was then added to the flask and the mixture was refluxed at 284° F. (140° C.) for 4 hours. The product was allowed to cool and filtered. The yield of bis(dioctylphenyl)dithiophosphoric acid was 183.5 grams.

A mixture of 2.0 grams (0.012 mole) of aziridineethyl methacrylate, 27.4 grams (0.108 mole) of lauryl methacrylate, 100 grams of benzene and 0.2 grams of α,α'-azodiisobutyronitrile is heated at 140° F. (60° C.) with stirring in a nitrogen atmosphere for 10 hours. To the resulting polymer is added 17.5 grams (0.024 mole) of bis(dioctylphenyl)dithiophosphoric acid. The system is flushed with nitrogen and the mixture is heated for 6 hours at 176° F. (80° C.). The resulting bis(dioctylphenyl)dithiophosphorylated copolymer of aziridineethyl methacrylate and lauryl methacrylate has a molecular weight in excess of 100,000.

EXAMPLE VIII

Preparation of Dibutyl Dithiophosphate Aziridineethyl Methacrylate/Lauryl Methacrylate Copolymer (1:4 mole ratio)

A dibutyl dithiophosphate, aziridineethyl methacrylate/lauryl methacrylate copolymer is prepared by mixing 62.1 grams (0.4 mole) of aziridineethyl methacrylate, 419.2 grams (1.6 moles) of lauryl methacrylate and 2.89 grams of α,α'-azodiisobutyronitrile in 962.6 grams of benzene and heating the mixture at 149° F. (65° C.) with stirring in a nitrogen atmosphere for 12 hours. To the above mixture is added 194.0 grams (0.8 mole) of dibutyldithiophosphate and the solution is heated at 140° F. (60° C.) for an additional 4 hours.

What is claimed is:

1. A dialkyl, diaryl, dialkaryl, diarylalkyl or diaryloxyalkyl dithiophosphorylated copolymer comprising the copolymer of (A) a monomeric aziridineethyl acrylate or methacrylate having the formula:

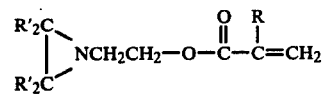

wherein R is selected from the group consisting of hydrogen and alkyl having from about 1 to about 6 carbon atoms; and each R' is either alike or different, selected from hydrogen and lower alkyl groups of from about 1 to about 8 carbon atoms; and (B) a monomeric alkyl acrylate or methacrylate of the formula:

wherein R" is selected from the group of hydrogen or methyl, and R''' is selected from straight and branched chain alkyl groups containing from about 1 to about 30 carbon atoms; with the mole ratio of A to B being in the range of from about 1:99 to about 30:60; said copolymer comprising the formula:

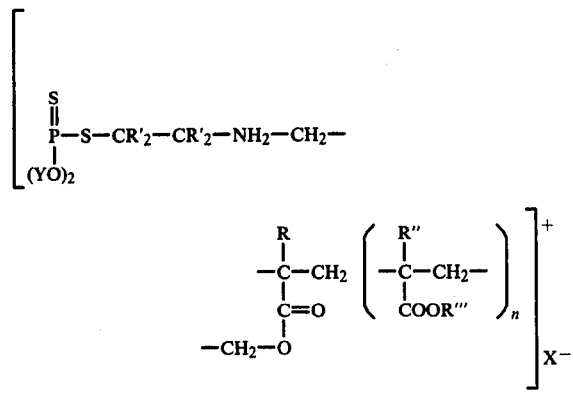

wherein R, R', R", and R''' are as described above; and Y is alkyl, aryl, alkaryl, arylalkyl or aryloxyalkyl having from about 1 to about 30 carbon atoms; X⁻ is

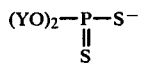

wherein Y is defined above and wherein n is an integer of from about 1 to about 300; said copolymer having a molecular weight of from about 20,000 to about 300,000; and at least 0.1 weight percent comprising the dialkyl, diaryl, dialkaryl, diarylalkyl or diaryloxyalkyl dithiophosphate moiety.

2. The copolymer of claim 1 wherein R is selected from the group consisting of hydrogen or alkyl having from about 1 to about 3 carbon atoms.

3. The copolymer of claim 1 wherein each R' is either alike or different selected from a lower alkyl group of from about 1 to about 4 carbon atoms.

4. The copolymer of claim 1 wherein R''' is selected from straight or branched chain alkyl groups containing from about 1 to 20 carbon atoms.

5. The copolymer of claim 1 wherein the monomeric aziridineethyl acrylate is a member selected from the group consisting of 2-(1-aziridinyl)ethyl acrylate, 2-(2-methyl-1-aziridinyl)ethyl acrylate, 2-(2-dimethyl-1-aziridinyl)ethyl acrylate, 2-(2-ethyl-1-aziridinyl)ethyl acrylate, 2-(1-aziridinyl)-1-propyl acrylate, 2-(2,3-dimethyl-1-aziridinyl)-1-butyl acrylate, 2(2,2-dimethyl-1-aziridinyl)-1-butyl acrylate, 2(2,2-diethyl-1-aziridinyl)-1-ethyl acrylate, 2-(2-n-butyl-1-aziridinyl)-1-ethyl acrylate, 1-(2-methyl-3-ethyl-1-aziridinyl)-2-butyl acrylate or 1-(1-aziridinyl)-2-hexyl acrylate.

6. The copolymer of claim 1 wherein the monomeric aziridineethyl methacrylate is a member selected from the group consisting of 2-(1-aziridinyl)ethyl methacrylate, 2-(2-methyl-1-aziridinyl)ethyl methacrylate, 2-(2-dimethyl-1-aziridinyl)ethyl methacrylate, 2-(2-ethyl-1-aziridinyl)ethyl methacrylate, 2-(1-aziridinyl)-1-propyl methacrylate, 2-(2,3-dimethyl-1-aziridinyl)-1-butyl methacrylate, 2(2,2-dimethyl-1-aziridinyl)-1-butyl methacrylate, 2(2,2-diethyl-1-aziridinyl)-1-ethyl methacrylate, 2-(2-n-butyl-1-aziridinyl)-1-ethyl methacrylate, 1-(2-methyl-3-ethyl-1-aziridinyl)-2-butyl methacrylate or 1-(1-aziridinyl)-2-hexyl methacrylate.

7. The copolymer of claim 1 wherein the monomeric alkyl acrylate is a member selected from the group consisting of methyl acrylate, ethyl acrylate, propyl acrylate, isopropyl acrylate, butyl acrylate, isobutyl acrylate, sec-butyl acrylate, t-butyl acrylate, 2-ethylhexyl acrylate, octyl acrylate, Oxo-octyl acrylate, isodecyl acrylate, undecyl acrylate, dodecyl acrylate, tridecyl acrylate, capryl acrylate, lauryl acrylate, myristyl acrylate, pentadecyl acrylate, palmityl acrylate or stearyl acrylate.

8. The copolymer of claim 1 wherein the monomeric alkyl methacrylate is a member selected from the group consisting of methyl methacrylate, ethyl methacrylate, propyl methacrylate, isopropyl methacrylate, butyl methacrylate, isobutyl methacrylate, sec-butyl methacrylate, t-butyl methacrylate, 2-ethylhexyl methacrylate, octyl methacrylate, Oxo-octyl methacrylate, isodecyl methacrylate, undecyl methacrylate, dodecyl methacrylate, tridecyl methacrylate, capryl methacrylate, lauryl methacrylate, myristyl methacrylate, pentadecyl methacrylate, palmityl methacrylate or stearyl methacrylate.

9. The copolymer of claim 1 wherein the ratio of the monomeric aziridineethyl acrylate or methacrylate to the monomeric alkyl acrylate or methacrylate is in the range of from about 1:99 to about 10:90.

10. The copolymer of claim 1 wherein the dialkyl, diaryl, dialkaryl, diarylalkyl or diaryloxyalkyl dithiophosphorylated moiety is a member selected from the group consisting of diisopropyl dithiophosphate, dibutyl dithiophosphate, di(2-ethylhexyl)dithiophosphate, di(Oxo-octyl)dithiophosphate, di(tridecyl)dithiophosphate, di(tetradecyl)dithiophosphate, di(hexadecyl)dithiophosphate, di(cyclohexyl)dithiophosphate, di(methylcyclohexyl)dithiophosphate, di(phenyl)dithiophosphate, di(cresyl)dithiophosphate, di(butylphenyl)dithiophosphate, bis(dioctylphenyl)dithiophosphate, bis(dinonylphenyl)dithiophosphate, bis(didecylphenyl)dithiophosphate, di(phenylethyl)dithiophosphate, di(phenylcarbinyl)dithiophosphate, di(cresoxyethyl)dithiophosphate, or di(cresoxypropyl(dithiophosphate.

11. The copolymer of claim 1 wherein the dialkyl, diaryl, dialkaryl, diarylalkyl or diaryloxyalkyl dithiophosphate moiety comprises from about 0.1 weight percent to about 60 weight percent of said copolymer.

12. The copolymer of claim 1 wherein the dialkyl, diaryl, dialkaryl, diarylalkyl or diaryloxyalkyl dithiophosphate moiety comprises from about 1.0 weight percent to about 30 weight percent of said copolymer.

13. The copolymer of claim 1 wherein n is an integer of from about 2 to about 99.

14. The copolymer of claim 1 having a molecular weight range of from about 100,000 to about 200,000.

15. The copolymer of claim 1 having a molecular weight range of from about 100,000 to about 300,000.

* * * * *